Patented Jan. 17, 1933

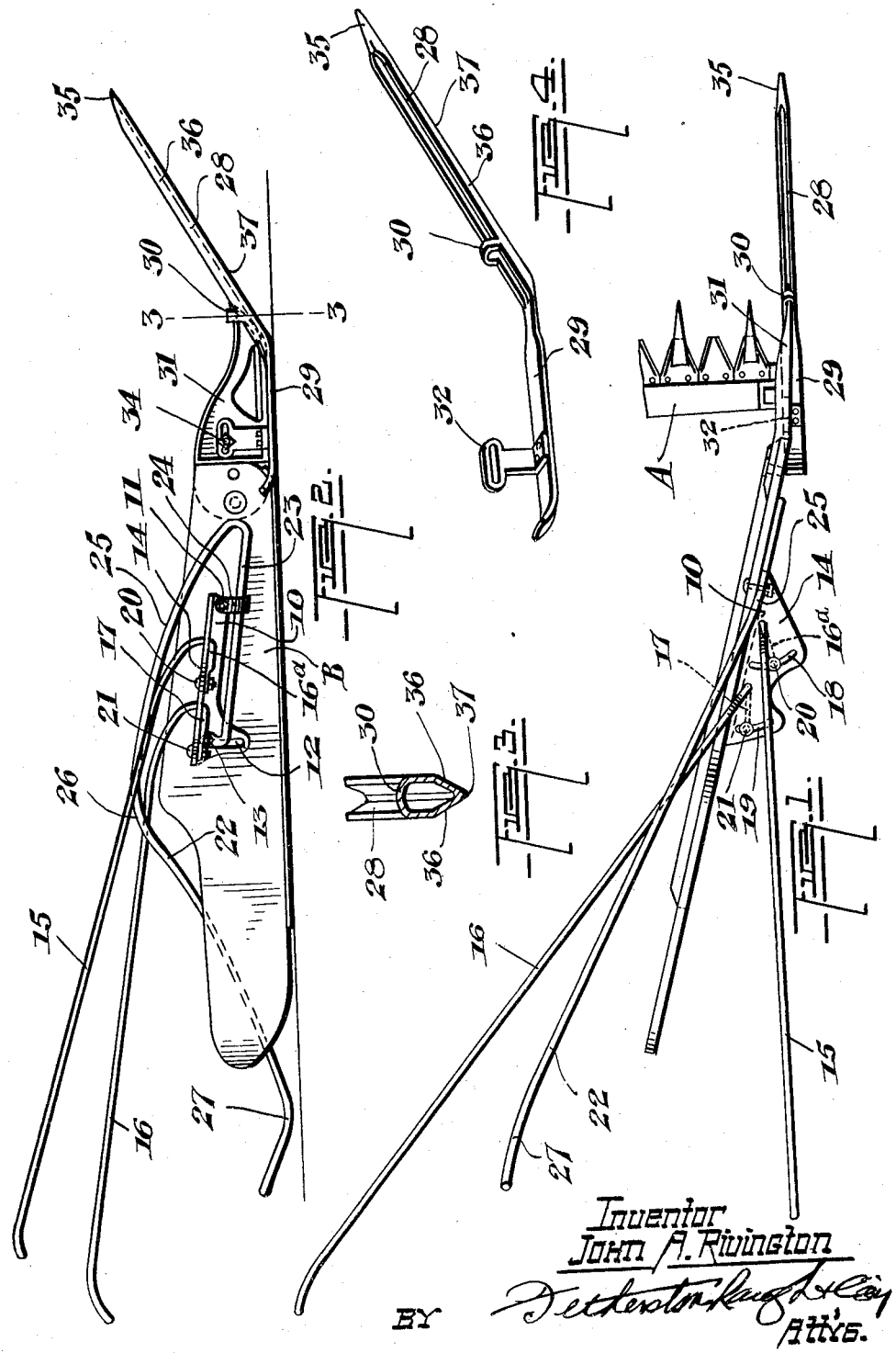

1,894,542

UNITED STATES PATENT OFFICE

JOHN ANDREW RIVINGTON, OF CARP, ONTARIO, CANADA

DIVIDING ATTACHMENT FOR MOWING MACHINES

Application filed August 5, 1932. Serial No. 627,613.

This invention relates to improvements in a divider for mowing machines and more particularly to an attachment for the ordinary divider or tracker board associated with the cutter bar of a mowing machine of the type disclosed in my prior United States Patent 1,792,607.

An object of the present invention is to provide a simple type of means associated with the tracker board for separating and depositing in a set position the cut swath of a crop such as hay, alfalfa, grain or the like, as it falls behind the cutter bar when the mowing machine moves forward in operation, thus leaving a clearance or passageway of predetermined width between the standing crop and the cut swath.

A further object of the invention is to provide a device of this character which is minutely adjustable to effectively control the extent of the separation.

A still further object of the invention is to provide positive means for setting the cut swath in a position on the ground so that it will not tend to be blown from its set position.

A still further object of the invention is the provision of means operating in conjunction with the cutter bar for effecting a clear line of division in the crop being cut and eliminating the possibility of leaving a fringe of uncut growth.

With these and other objects in view the invention consists essentially of a series of adjustable arms supported from the divider or tracker board including a tucker rod for turning back into the standing crop any overhanging portions thereof, a divider arm for contacting with and directing the fall of the crop, a guard arm co-operating with the tucker arm to place and guide the cut crop to the desired position, including unitary means for holding and permitting individual adjustment of two of said arms, with the provision in connection with the cutter bar of a divider finger for effecting a clear line of division in the crop to be cut and formed to eliminate a fringe of uncut crop during operation, as more fully described in the following specification and illustrated in the accompanying drawing.

In reference to the drawing:

Figure 1 is a top plan view of the improved attachment showing the cutter bar fragmentally.

Figure 2 is a side elevation of the attachment.

Figure 3 is a section on the line 3—3 of Fig. 2, and

Figure 4 is a perspective view of the divider finger.

Referring more particularly to the drawing, A indicates the cutter bar of an ordinary mowing machine and B the divider or tracker board of well known construction associated therewith. On the side of the divider board B a unitary bracket 10 is pivotally mounted as at 11 and, by means of a slot 12 co-operating with a bolt or the like 13 secured through the divider board, the bracket 10 may be swung about its pivotal point to permit of a swinging adjustment. As illustrated in Figure 1 the bracket 10 is provided with a horizontally projecting apron 14 which may be of any suitable form, but preferably as illustrated in Fig. 1. Mounted in the apron 14 is the tucker arm 15 and the divider arm 16, one end of each projecting through an orifice formed therefor in the apron 14, and these ends are bent respectively as at 16ª and 17 to lie parallel with the underside of the apron 14 terminating in an orificed lug or the like which is designed to register in each case with the arcuate slots 18 and 19 formed in the apron. Upon passing bolts 20 and 21 through the arcuate slots and through the orificed lugs and securing the bolts by nuts, the tucker arm and divider arm may be adjusted laterally and secured in adjusted position, since upon loosening the nuts these arms may be swung about their pivotal point, which is that point at which they pass through the apron, and upon securing the nuts the bolts 20 and 21 will serve to fasten these rods in adjusted position in the slots 18 and 19. Therefore, due to the fact that the bracket may be swung about its pivotal point 11, these arms are both vertically and horizontally adjustable.

The tucker arm may be formed as shown in Fig. 1 projecting in a straight line or it may be slightly curved as desired, its function being to contact with the standing crop and turn back any overchanging portions thereof. On the other hand the divider arm 16 projecting at a substantially opposite angle is designed to contact with the cut crop and to guide it in falling to lie in a direction away from the standing crop, the distance between the tucker arm and the divider arm regulating the clearance or passageway between the standing and the cut crop.

Co-operating with the divider arm 16 is the guard rod 22, this guard rod being formed with a shank 23 which is fastened at one end by means of the bolt 13 to the divider board, the shank passing through the guide 24 which is fastened by the bolt forming the pivotal mounting 11 of the bracket 10. Consequently the guard rod is held rigidly on the divider board. The guard rod is resilient in character and projects rearwardly from its shank as at 25 being downwardly bent as at 26 to terminate in the curved runner or bearing member 27 which normally lies just above the surface of the ground. On referring to Fig. 1, it will be noted that the guard rod is adapted to project at a somewhat similar angle to the divider arm 16 so that the guard rod serves to positively press the cut crop downwardly into the position it is initially guided to by the divider arm 16, so that this will set the cut crop firmly in a set position and tend to obviate it from being blown or displaced into the clearance or passageway formed by the divider arm 16 between the cut crop and the standing crop.

Co-operating with these arms is a divider finger 28 which is formed with a shoe 29 designed to take the place of the shoe normally mounted on the end of the cutter bar. To fit the divider finger upon the mower, it is provided with the loop or fastening element 30 designed to fit over the point of the casting 31 to which the shoe is normally attached, the slotted bracket 32 secured to the shoe 29 being designed to co-operate with the bolt 34 normally used for securing the shoe to the casting. The bracket 32 will permit of the attachment of this finger to various types of mowers owing to the slot that accommodates the usual bolt 34 which may be positioned in a more forward or rearward position in mower structures different to that illustrated in Fig. 2. Upon securing the bolt 34 upon the bracket 32, after the loop 30 has been pulled over the point of the casting 31, the divider finger is rigidly mounted.

The divider finger projects forwardly of the cutter bar and upwardly at an angle, being pointed as at 35 to divide the crop being cut and to direct that part of the crop which should be cut, in the instant operation, to the cutter knives. The bar may be of channel form as illustrated and is provided with sloping forward surfaces 36 terminating in the edge 37, this formation being of importance since it will clearly divide the crop and direct it to the cutting knives while eliminating the possibility of turning down certain portions of the crop which it contacts with and thus leave an upstanding fringe of uncut growth during each cutting operation. Accordingly the combination between the divider finger and the tucker arm, divider arm and guard arm is such as to collectively cleanly divide the crop being cut providing a clear passageway or clearance between the cut and uncut crop and firmly setting the cut crop in a predetermined position, all in one operation as the mower proceeds in its normal passage through the field during harvest.

It will be particularly noted that the construction is very simple and compact and that all parts are readily removable, in addition to the fact that the tucker arm and divider arms are adjustable, independently of each other in a horizontal direction and collectively in a vertical direction.

Various modifications may be made in this invention without departing from the spirit thereof or the scope of the claims, and therefore the exact forms shown are to be taken as illustrative only and not in a limiting sense, and it is desired that only such limitations shall be placed thereon as are disclosed in the prior art or are set forth in the accompanying claims.

I claim:—

1. An attachment for mowing machines comprising, in combination with the divider board, a pivotally mounted unitary bracket, a tucker arm and a divider arm mounted on said bracket and projecting rearwardly of the divider board, means for horizontally adjusting said arms relatively to one another, and means for vertically adjusting said arms.

2. An attachment for mowing machines comprising, in combination with the divider board, a tucker arm to contact with the standing crop and a divider arm to guide the falling crop both secured to the divider board and a downwardly extending, rearwardly projecting guard rod secured to the divider board co-operating with the divider arm to press the cut crop.

3. An attachment for mowing machines comprising, in combination with the divider board, a tucker arm to contact with the standing crop and a divider arm to guide the falling crop both secured to the divider board, a downwardly extending, rearwardly projecting guard rod secured to the divider board co-operating with the divider arm to press the cut crop, means for horizontally adjusting the tucker arm and divider arm relatively to one another, and means for vertically adjusting said arms.

4. An attachment for mowing machines comprising, in combination with the divider board, a pair of rods secured to the divider board and projecting rearwardly in substantially the same plane and at relatively opposed angles designed to contact respectively with the standing and falling crop, and a third rod secured to the divider board projecting rearwardly and downwardly in a plane lower than said pair of rods designed to cooperate with one of said pair of rods to press the falling crop.

5. The device as claimed in claim 4, in which the third rod terminates in a curved runner.

6. An attachment for the cutter bar structure of mowing machines comprising in combination a divider board connected to the cutter bar structure and provided with rearwardly projecting, relatively adjustable rods designed to contact with the standing and falling crop respectively, a guard rod secured to the divider board projecting rearwardly and in a plane lower than said adjustable rods to press the falling crop, and a divider finger secured to the cutter bar structure and projecting forwardly thereof to divide the standing crop being cut.

7. The device as claimed in claim 6, in which the dividing finger is pointed and upwardly inclined from the cutter bar structure.

8. The device as claimed in claim 6, in which the divider finger is formed with sloping surfaces terminating in a common edge.

9. In an attachment for the cutter bar structure of mowing machines including means for separating the standing and falling crop, a divider finger secured to the cutter bar structure projecting forwardly and rearwardly from said structure, said finger being pointed and provided with means permitting removable mounting on said cutter bar structure.

10. The device as claimed in claim 9, in which the divider finger is provided with sloped surfaces terminating in a common edge to cleanly guide the crop being cut.

11. In an attachment for the cutter bar structure of mowing machines, a pointed divider finger secured to and upwardly inclined from the cutter bar structure, said bar being provided with sloping surfaces terminating in a common edge and formed with means for permitting removable attachment of the finger to the cutter bar structure.

12. In an attachment for the cutter bar structure of mowing machines, a divider finger having a portion forming a shoe for the cutter bar structure and an upwardly inclined, forwardly projecting portion having a pointed end, sloping surfaces terminating in a common edge, and means permitting removable mounting on the cutter bar structure.

In witness whereof I have hereunto set my hand.

JOHN ANDREW RIVINGTON.